United States Patent [19]

Cummins

[11] Patent Number: 4,798,398
[45] Date of Patent: Jan. 17, 1989

[54] DUAL RATE EQUALIZER SUSPENSION

[75] Inventor: Nolan W. Cummins, Bristow, Okla.

[73] Assignee: Unit Rig & Equipment Co., Tulsa, Okla.

[21] Appl. No.: 84,681

[22] Filed: Aug. 12, 1987

[51] Int. Cl.$^4$ ............................................. B60G 11/26
[52] U.S. Cl. .................................... 280/708; 280/702; 280/709
[58] Field of Search .............. 280/688, 702, 112, 124, 280/611, 708, 709, 698, 112 A, 112 R, 711; 267/64.11, 113

[56] References Cited

U.S. PATENT DOCUMENTS

| | | | |
|---|---|---|---|
| 2,937,034 | 5/1960 | Langen | 280/124 |
| 3,011,777 | 12/1961 | Stout | 267/64 |
| 3,100,635 | 8/1963 | Bougeard | 267/65 |
| 3,112,923 | 12/1963 | Ley | 267/11 |
| 3,179,432 | 4/1965 | Chaneac et al. | 280/6 |
| 3,239,236 | 3/1966 | Flowers | 280/104.5 |
| 3,295,623 | 1/1967 | Kyzer | 180/23 |
| 3,391,921 | 7/1968 | Axthammer | 267/64 |
| 3,482,855 | 12/1969 | Capgras | 280/124 |
| 3,606,374 | 9/1971 | Capgras | 280/112 |
| 3,694,111 | 9/1972 | Braun | 417/491 |
| 3,848,862 | 11/1974 | Ito et al. | 267/64 R |
| 3,873,121 | 3/1975 | Ito et al. | 280/124 F |
| 3,876,192 | 4/1975 | Kauer | 267/65 R |
| 4,095,822 | 6/1978 | Thornhill | 280/702 |
| 4,212,484 | 7/1980 | Fujii | 280/708 |
| 4,270,771 | 6/1981 | Fujii | 280/708 |
| 4,278,272 | 7/1981 | Leibeling | 280/708 |
| 4,326,733 | 4/1982 | Rubalrava | 280/708 |
| 4,408,773 | 10/1983 | Meller et al. | 280/611 |
| 4,478,431 | 10/1984 | Muller et al. | 280/708 |
| 4,566,718 | 1/1986 | Kanai et al. | 280/708 |
| 4,573,705 | 3/1986 | Kanai et al. | 280/708 |
| 4,619,467 | 10/1986 | Lafferty | 280/708 |
| 4,671,534 | 6/1987 | Yano | 280/708 |
| 4,695,074 | 9/1987 | Kobayashi | 280/707 |
| 4,700,812 | 10/1987 | Moser | 280/707 |

OTHER PUBLICATIONS

Article entitled "Shock Absorbers Have Stroke-Regulated Action", May, 1987 issue of Automotive Engineering.

Primary Examiner—Richard A. Bertsch
Attorney, Agent, or Firm—Head & Johnson

[57] ABSTRACT

A suspension system for a vehicle in which each suspension system at each wheel has a dual spring rate. An external accumulator is used in connection with the main oil/gas strut but is charged to a higher initial pressure than the pressure of the main strut. Thus, the external accumulator has no effect until the load on the vehicle reaches a predetermined amount. At this time, the external accumulator becomes effective and the total suspension system, including the strut assembly and the accumulator, produces a different spring rate function. In another embodiment load equalization between two rear wheels is obtained by a connecting conduit connecting the oil chambers of the two oil/gas strut systems.

8 Claims, 2 Drawing Sheets

DUAL RATE EQUALIZER SUSPENSION

BACKGROUND OF THE INVENTION

The field of the present invention is in oil/gas suspension struts for off-road vehicles.

For ages men have been suspending a frame on which a load is to be carried from the axle of a wheel or wheels. At first the frame merely set on the axle, sort of like a wheelbarrow. However, the operator of the vehicles kept looking for more comfort to the operator and better suspension system to prevent damage to the vehicle. At first the frame was supported only by springs. The springs could be leaf springs or coil springs. Later on compressed gas was widely used as the spring element in suspension systems. The unrestrained or undampened motion of any spring element, either a mechanical or gas spring provides an unacceptable ride. Hence, the incorporation of dampening on shock absorber elements in any suspension system becomes common place. The shock absorbers include telescoping piston with a housing and the passage of fluid from one side of the piston to the other is controlled to give proper dampening to the vehicle.

In some of the heavy duty off-road vehicles each wheel may have a gas/oil suspension system. In this there is a housing having a piston therein and which has a gas, usually nitrogen in the upper end charged to a certain pressure and in contact with oil. The compressed gas acts as a spring and controlling the flow of oil from one portion of the system to another provides the dampening. In these vehicles it is most difficult to get the right combination of gas and oil with proper pressure and volume to obtain the desired spring rate over a wide range of loads. For example, if the right combination is found to give a smooth ride at no load on the vehicle then when the vehicle is completely loaded it might be too stiff a ride. Another problem which the prior suspension system has is that when the vehicle goes to rough or rolling terrain, frequently the four wheels are not on one plane. With the prior art suspension system the frames will be twisted by this uneven surface.

It is therefore an object of this present invention to provide a suspension system in which a dual spring rate can be obtained. It is still a further object of this invention to provide equalizing means between the two suspension systems so as to maintain the supported frame in a flat condition or single plane by preventing twisting forces from being applied to it.

SUMMARY OF THE INVENTION

In large off-highway vehicles the ratio of loaded weight to empty weight may vary from two to one at the front suspension to ten to one at the rear suspension. This creates a need for a suspension system having two different spring rates and dampening characteristics. To accommodate this I provide a dual spring rate suspension system so that I have one spring rate when the vehicle is empty or nearly empty and another spring rate when the vehicle is loaded. I have a hydraulic cylinder partly filled with oil and a gas in the closed end above the oil. The upper end of the cylinder is connected to the vehicle frame and a piston rod is connected to the axle. I provide a gas charged external accumulator hydraulically connected to the suspension cylinder. However, the accumulator is ineffective during the empty or near empty condition of the vehicle. I accomplish this by precharging the gas in the external accumulator to a pressure $P_1$ higher than the pressure $P_2$ of the gas in the hydraulic cylinder required to support the empty vehicle. But the pressure $P_1$ is less than that required for a loaded vehicle. So I have a first spring rate while the external accumulator is inactive. However, as soon as the vehicle is loaded to a point where oil is forced from the suspension to the accumulator, the gas in the accumulator becomes an effective part of the overall suspension system and I have a second spring rate. Thus, I obtain a reasonable or acceptable low spring rate loaded without unacceptable soft or low spring rate when empty.

In order to obtain proper dampening for the empty vehicle I provide two spaced apart ports in the wall of the suspension cylinder with conduits connecting such ports. One of the conduits has a check valve. When the vehicle is empty the piston is between the ports. Dampening is provided by regulating the oil flow through these conduits as the piston moves in response to the vehicles motion over uneven ground. When the vehicle is loaded, the piston is above the ports, and thus the ports are ineffective. The dampening is obtained in the loaded condition by oil flowing from the cavity of the piston rod to the rebound cavity which is between the rod and the inner wall of the cylinder. This flow is regulated as it flows between the two chambers.

Large size vehicles when traveling over off-road terrain usually have four tire ground contact points which frequently are out of plane causing twisted forces and stresses to be introduced to the frame. I provide a means to equalize the load between the two suspensions (typically rear) of the wheels. This includes a first gas/oil strut supporting the frame from a first axle attachment and a similar second gas/oil strut supporting the frame from a attachment. I connect the two oil containing chambers of the two gas/oil struts by a conduit. When one gas/oil strut is loaded heavier than the other, the pressure will be higher in the one with the heaviest load and the oil will flow to the lower pressure until pressure and load equalize. An orifice in the connecting conduit damps unwanted oscillations.

DETAILED DESCRIPTION OF THE PREFERRED EMBODIMENT

Figure 1:
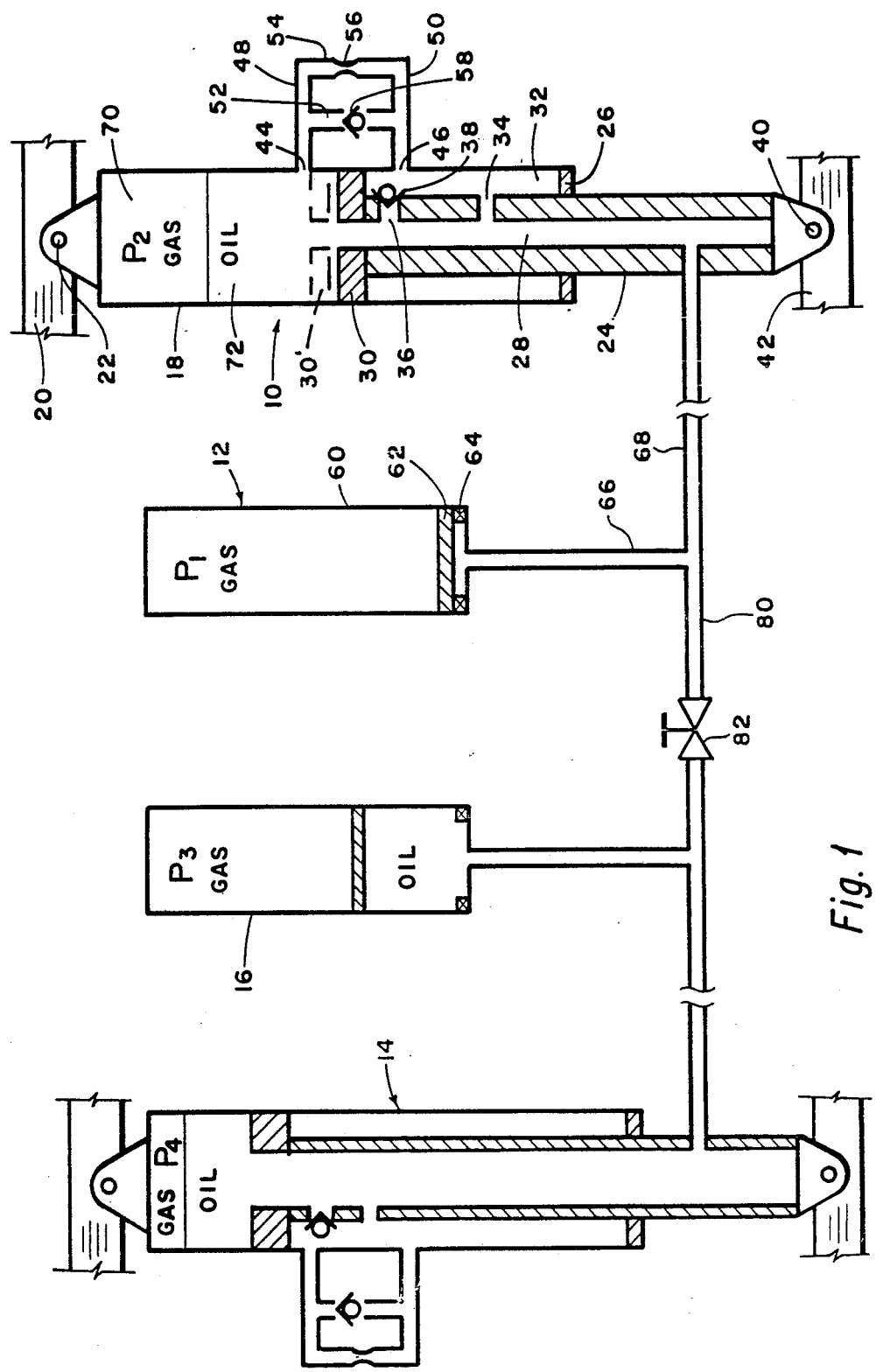
FIG. 1 is a diagrammatic drawing showing a dual rate suspension system for vehicles and a load equalization connection between the two suspension systems.

Attention is directed to FIG. 1. This FIGURE shows a dual spring rate dual dampening rate suspension with provision for equalizing load. Shown thereon in diagrammatic form is a suspension system for the left side and the right side of a large off-highway vehicle. The right side suspension system includes a cylindrical suspension 10 and an external accumulator 12. The left side suspension includes cylinder 14 and its external accumulator 16. The right and left side suspensions are identical. As the two sides are identical only the right need be discussed in detail. The right suspension 10 provides a first spring rate and includes a cylindrical housing 18 which is closed at the upper end and is connected to frame 20 by conventional means 22. The lower end of housing 18 is open and a plunger 24 extends through the opening and is in sealing engagement with the annular closing member 26. Plunger 24 is provided with an axial passage 28. A piston 30 is attached to the upper end of plunger 24 and can move vertically within the housing 18. The piston 30 has sealing engagement with the inner wall of housing 18.

There is an annular space identified as rebound annular chamber 32 between the outer wall of plunger 24 and the inner wall of housing 18. Plunger 24 has a fixed cushion orifice 34 and a primary orifice 36. Primary orifice 36 has check valve 38 therein which permits flow of fluid only from within cavity 28 to rebound annular chamber 32. The lower end of plunger 24 is connected by conventional means 40 to the axle 42.

The wall of cylinder 18 is provided with an upper bypass port 44 and a lower bypass port 46. A first conduit 48 connects to bypass port 44 and a second conduit 50 connects to lower bypass port 46. First conduit 48 and second conduit 50 are connected by parallel conduits which are restricted conduit 52 and free bypass conduit 54. Conduit 54 has a fixed orifice 56 therein and permits flow in either direction. Conduit 52 has a check valve 58 therein which permits flow of fluid only from above the piston 30 to the rebound chamber 32.

Means for providing a second spring rate by use of an external accumulator will now be discussed. External accumulator 12 includes a housing 60 with free piston 62 mounted therein. Stops 64 are provided below piston 62. The space in housing 60 below piston 62 is connected by conduits 66 and 68 to internal passage 28 of plunger 24.

A gas is provided for space 70 in the upper part of housing 18 of the suspension system and oil is provided in space 72 below the gas space 70. Oil also fills the axial passage 28 of plunger 24 and the rebound annular chamber 32. A gas under pressure $P_1$ is provided in cylinder 60 above piston 62 and oil is in the space beneath the piston 62 and in conduits 66 and 68. The right hand suspension system 10 is shown in the unloaded or empty position for a vehicle. The gas in space 70 is injected at a pressure $P_2$ so that piston 30 is between ports 44 and 46 when the truck is empty, i.e. there is no load on the suspension system except the load of the truck itself. The gas is used as the spring suspension element and oil for dampening. The ratio of loaded weight to empty weight may vary from two to one for the front suspension system to up as high as ten to one at the rear suspension system where the bulk of the load is placed. This creates a need for a suspension system having different spring rates and dampening for empty and loaded conditions. My invention provides for this. In operation gas is provided under a selected pressure $P_2$ into gas space 70 under pressure such that piston 30 is between ports 44 and 46 when there is no load on the vehicle. As increased load is applied to the suspension 10 due to a bump in the road, piston 30 will tend to move up within the cylinder 18 up to a position indicated by dashed lines 30'. This will compress the gas in gas space 70 and also force some oil out port 44 from oil space 72 above the piston 30. This oil will flow freely through orifices 34 and 56 and check valves 58 and 38. Oil will flow readily around the piston 30 until a new equilibrium position is reached. As wheel rolls over bump to level road, load on suspension 10 will decrease and piston 30 will tend to move down cylinder 18 to its original position. Oil will be forced from rebound annular space 32 through orifices 34 and 56 as checks 38 and 58 prevent flow in this direction. Thus return flow is restricted and suspension is damped in rebound direction. When the vehicle is unloaded or has a small load the oil in space 72 is under a smaller pressure, thus it needs a relatively high bypass capacity to obtain proper dampening.

As shown on the left of the drawings when the vehicle is loaded the load increases and piston 30 moves above port 44 (shown on left). The pressure of the oil 72 has greatly increased and the flow into rebound annular chamber 32 is then only through orifice 34 and orifice 36. On return the check valve 38 closes and flow is through orifice 34 thereby providing the dampening.

A second spring rate is provided by gas charged accumulator 12 which is hydraulically connected to the suspension strut 10. The accumulator is precharged to a pressure $P_1$ which is higher than required to support the empty vehicle but less than that required for a loaded vehicle. Thus when the vehicle is unloaded accumulator 12 is not operative. As the vehicle is loaded, the pressure will rise in the suspension strut 10 to the point where oil has a pressure in excess of $P_1$ and is forced from the suspension strut 10 into the accumulator under piston 62. The accumulator 12 then becomes an effective part of the suspension system. This provides an acceptable soft or low spring rate when the vehicle is loaded without being unacceptably soft (low) when empty. Thus, by the use of my invention the strut suspension has a different spring rate when loaded from when empty.

The primary (loaded) dampening is controlled by cushion orifice 34 and check valve 38 between longitudinal passage 28 of plunger 24 and the rebound annuluar chamber 32.

In order to get the right dampening when the vehicle is empty and the pressure $P_2$ is lower I have provided for additional oil passages through my external bypass which includes conduits 52 and 54 having check valve 38 and orifice 56 respectively. When the vehicle is loaded, piston 30 is above both ports or blocks the top port so that no fluid passes through the bypass. However, when empty the piston 30 is between the ports allowing oil to flow around the pistons. Thus I have effective dampening when the vehicle is either loaded or unloaded. Another advantage of the system which I have disclosed is that the external dampening valve circuits can be quickly tested for the anticipated load and can be adjusted in size as required to obtain the desired dampening.

As noted above the left hand suspension which includes the suspension srut 14 and accumulator 16 are identical to strut 10 and accumulator 12 so they will not need to be described in detail. However, it can be said that the left hand strut 12 is shown loaded and the piston is above the bypass ports. The above comments and considerations for $P_1$ and $P_2$ apply to $P_3$ and $P_4$, respectively.

In the above discussion it can be considered that valve 82 in conduit 80 was closed. The foregoing description and discussion are valid even if conduit 80 and valve 82 were removed. Valve 82 and conduit 80 do have a very definite purpose as will now be discussed.

Large off-road vehicles are likely to travel over terrain which causes the four tire ground points to be out of plane. This creates a need to equalize the load between the two suspensions. I accomplish this by connecting the axle cavity 28 of the two plungers by a conduit 80 having an orifice 82 which may be an adjustable sized orifice. With this arrangement when one suspension strut is loaded heavier than the other the pressure will be higher on that higher loaded one and the oil will flow to the lower pressure until the pressure and load equalizes. The equalizer orifice 82 dampens unwanted oscillations. As a vehicle with my system mounted thereon goes over uneven terrain, the tires may be out of plane but the frame is held in a plane by the action of the equalizing conduit 80. Without this there would be a twisting load placed on the frame. However, with my system the twisting forces on the frame caused by uneven terrain are eliminated.

Figure 2:
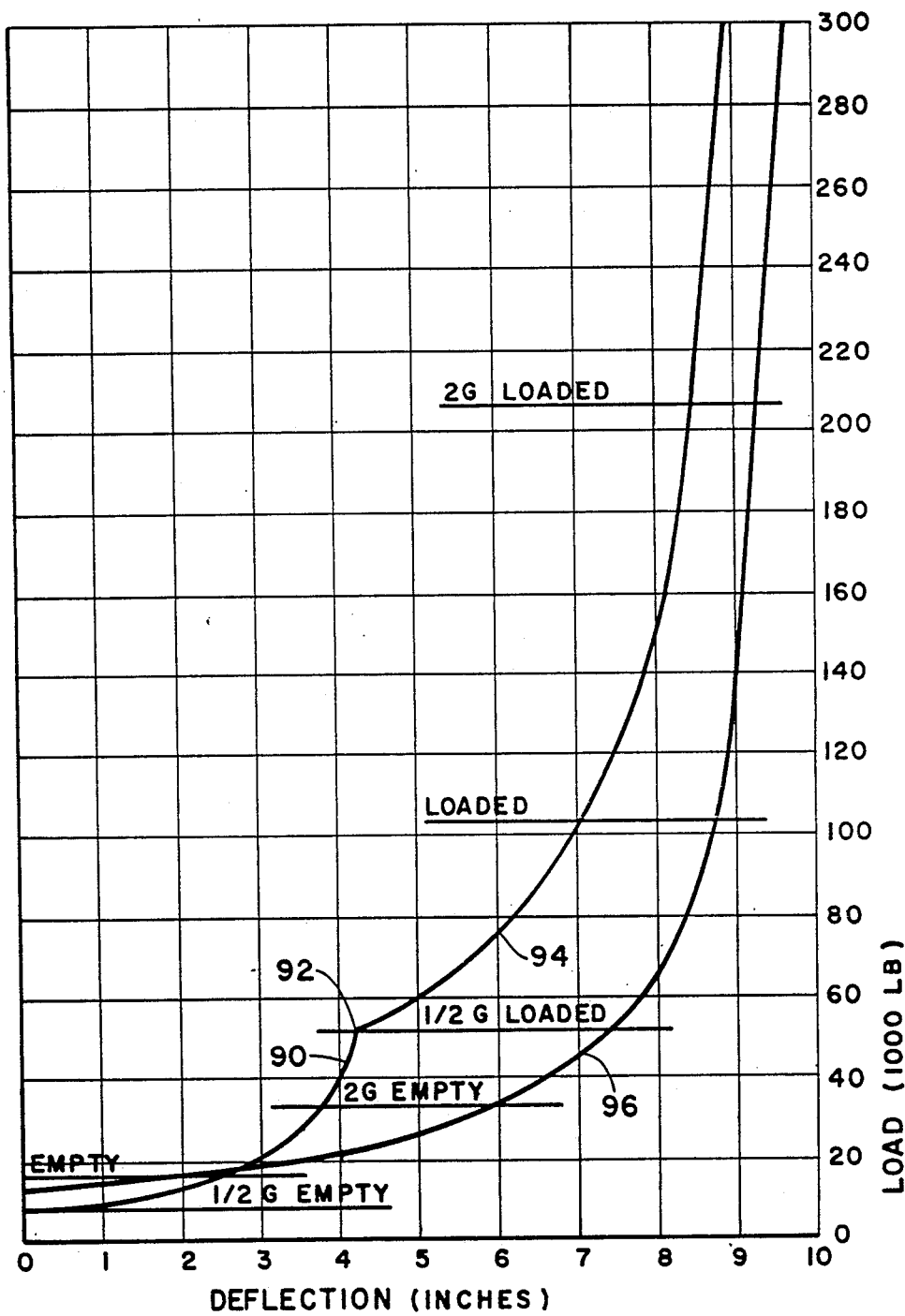
FIG. 2 illustrates a curve showing deflection versus load for the dual rate external accumulator system shown in FIG. 1.

Attention is next directed to FIG. 2 which shows a first curve composed of a first part 90 and a second part 94 and a second continuous curve 96 in which the abscissa is deflection in inches and the ordinate is load in thousands of pounds. Curve 96 is a single rate suspension system which would typically be the suspension strut 10 without the accumulator 12. For a typical selection of oil volume and gas charge, the response curve would take on a shape similar to that for curve 96 which is just one smooth curve.

However, by using the accumulator 12 in conjunction with the suspension strut 10 I obtain different characteristic, i.e. two curve portions with an abrupt change where they connect. For example, while $P_1$, that is the gas in accumulator 12 is greater than $P_2$ of the gas in suspension strut 10, I will have a typical curve 90. However, when $P_2$ becomes greater than $P_1$, the effect of accumulator 12 is brought into being and I obtain a second spring rate illustrated by curve portion 94. When the load is applied to the suspension strut the pressure $P_2$ on the gas increases and as it reaches the pressure $P_1$ in the accumulator 12, oil will start moving upwardly in cylinder 60 and piston 62 would likewise move up. At this time I have a different load deflection characteristic or second spring rate, thus the sharp break at 92 and from there the curve for the system would be as typically indicated by curve 94. These curves were calculated from selected parameters to show what typically may occur when using my invention having a double spring rate over the single rate system.

Reading from curve 96 for a single rate suspension system and curves 90 and 94 for a double rate suspension system I get the following table:

|  | FORCE ON SUSPENSION SYSTEM | DEFLECTION IN INCHES |
|---|---|---|
| SINGLE RATE | | |
| EMPTY | ½ G to 2 G Load | 6 |
| LOADED | ½ G to 2 G Load | 1¾ |
| DOUBLE RATE | | |
| EMPTY | ½ G to 2 G Load | 3¾ |
| LOADED | ½ G to 2 G Load | 4¼ |

It can be seen from curve 96 then if I have only a single rate that for the lower forces for the single rate I can have considerable deflection for the empty load so there is a soft ride. However, when loaded the deflection available is only about 1¾ inches which results in a very stiff or hard ride. This is hard on the equipment and hard on the operator. For a double rate suspension system I can distribute the deflection over different loads as shown by curve portions 90 and 94. For empty, for ½ G to 2G I can have a deflection of about 3¾ inches and for loaded I will have a deflection of about 4¼ inches. Thus, by the use of my system in using the accumulator 12 in conjunction with the suspension struts 10 I can obtain more balance in the smoothness of the ride of the vehicle for both loaded and unloaded conditions in that I have a double rate spring system. This is extremely important when one considers that the load variation from loaded to empty may be ten to one. The scales used are for illustration only and do not restrict design parameters.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. A suspension strut for a vehicle having a frame and an axle which comprises:
    a housing having a closed end and connectable at the closed end to said frame, the other end of said housing having an opening;
    a plunger extending through said opening, an axial passage extending axially within said plunger;
    a piston connected to the end of said plunger which is in said housing, said piston having a passage therethrough which is aligned with the passage of said plunger;
    a first and second orifice in the wall of said plunger and a check valve in one of said orifices;
    a first and second orifice longitudinally spaced apart and in the wall of said housing;
    a first bypass conduit means connecting said first and second housing orifices;
    a second bypass conduit means connecting the first and second housing orifices;
    an orifice in one of said bypass conduits;
    a check valve in one of said bypass conduits.

2. A suspension strut as defined in claim 1 including an accumulator cylinder having a free piston therein, stop means limiting the movement of said free piston in one direction and conduit means connecting the interior of the accumulator on the side of said free piston adjacent the stops and said plunger passageway.

3. A suspension system for a vehicle having a frame and an axle which comprises:
    an impervious housing having a closed end and connectable at the closed end to said frame, the other end of said housing having an opening; a plunger extending through said opening, an axial passage extending through said plunger;
    a piston connected to the end of said plunger which is in said housing, said piston having a passage therethrough which is aligned with the axial passage of said plunger;
    an orifice in the wall of said plunger permitting flow of fluid from said axial passage within said plunger to the annular space between the plunger and the housing;
    an accumulator cylinder; a free piston within said cylinder and movable between a first position and a second position;
    conduit means connecting the interior of the accumulator adjacent said second position to said axial passageway in said plunger;

a gas in said accumulator on one side of said piston and having a pressure of $P_2$;

a gas having a pressure $P_1$ in the part of said housing adjacent said closed end, $P_1$ being less than $P_2$ when the free piston is at said second position;

oil in said housing in the space not occupied by said gas and in said conduit to said accumulator;

said housing having no communication with the external atmosphere.

4. A suspension strut as defined in claim 3 including:

a second orifice in the wall of said plunger with a check valve in said second orifice permitting flow of fluid only from said axial passageway to the annular space between the plunger and the housing;

first and second orifices longitudinally spaced apart and in the wall of said housing;

a first conduit means connecting said first and second housing orifices;

a second conduit means connecting the first and second housing orifices; an orifice in each of said bypass conduits;

a check valve in one of the orifices of one of said bypass conduits permitting fluid flow only from the orifice near the closed end of said housing to the second orifice.

5. A suspension system for a vehicle having a frame and an axle attachment having two units with each unit comprising:

an impervious housing having a closed end and connectable at the closed end to said frame, the other end of said housing having an opening; a plunger extending through said opening, an axial passage extending through said plunger;

a piston connected to the end of said plunger which is in said housing, said piston having a passage therethrough which is aligned with the axial passage of said plunger;

an orifice in the wall of said plunger permitting flow of fluid from said axial passage within said plunger to the annular space between the plunger and the housing;

an accumulator cylinder;

a free piston within said cylinder and movable between a first position and a second position;

first conduit means connecting the interior of the accumulator adjacent said second position to said axial passageway in said plunger;

a gas in said accumlator on one side of said piston and having a pressure of $P_2$;

a gas having a pressure $P_1$ in the part of said housing adjacent said closed end, $P_1$ being less than $P_2$ when the free piston is at said second position;

oil in said housing in the space not occupied by said gas and in said conduit to said accumulator;

said housing having no communication with the external atmosphere; a second orifice in the wall of said plunger with a check valve in said second orifice;

first and second orifices longitudinally spaced apart and in the wall of said housing;

a first conduit means connecting said first and second housing orifices; a second conduit means connecting the first and second housing orifices; an orifice in each of said bypass conduits;

a check valve in one of the orifices of one of said bypass conduits, units connecting conduit connecting said axial passageway in said plunger of one unit with the axial passageway of the plunger in the other unit;

an orifice in said units connecting conduit.

6. A suspension system as defined in claim 5 including a valve in said units connecting conduit.

7. A suspension system for a vehicle adapted to have a loaded and an unloaded condition with a frame and two spaced apart wheels supported by axles which comprise:

a first gas/oil strut supporting said frame from a first axle attachment, said strut having a first oil containing chamber;

a second gas/oil strut for supporting said frame from a second axle attachment, said second gas/oil strut having a second oil containing chamber;

a connecting conduit connecting said first and second oil containing chamber;

an orifice in said connecting conduit; each said gas/oil srut including:

a housing having a closed end connectable at the closed end to same frame, the other end of said housing having an opening;

a plunger extending through said opening, an axial passage extending axially within said plunger;

a piston connected to the end of said plunger which end is in said housing, said piston having a passage therethrough which is aligned with the passage of said plunger;

a first and second orifice in the wall of said plunger and a check valve in one of said orifices permitting flow of fluid from said axial passage within said plunger to the annular space between the plunger and the housing;

a first and second orifice longitudinally spaced apart in the wall of said housing;

a first bypass conduit means connecting said first and second housing orifices;

a second bypass conduit means connecting the first and second housing orifices;

an orifice in one of said bypass conduits;

a check valve in one of said bypass conduits permitting fluid flow only from the orifice near the closed end of said housing to the second orifice.

8. A suspension system for a vehicle adapted to have a loaded and an unloaded condition with a frame and two spaced apart wheels supported by axles which comprise:

a first gas/oil strut supporting said frame from a first axle attachment, said strut having a first oil containing chamber;

a second gas/oil strut for supporting said frame from a second axle attachment, said second gas/oil strut having a second oil containing chamber;

a connecting conduit connecting said first and second oil containing chamber;

an orifice in said connecting conduit;

each said gas/oil strut including:

a housing having a closed end connectable at the closed end to said frame, the other end of said housing having an opening;

a plunger extending through said opening, an axial passage extending through said plunger;

a piston connected to the end of said plunger which is in said housing, said piston having a passage therethrough which is aligned with the axial passage of said plunger;

an orifice in the wall of said plunger permitting flow of fluid from said axial passage within said plunger to the annular space between the plunger and the housing;

an accumulator cylinder;

a free piston within said cylinder and movable between a first position and a second position;

conduit means connecting the interior of the accumulator adjacent said second position to said axial passageway in said plunger;

a gas in said accumulator on one side of said piston and having a pressure of $P_1$ which is more than required to support the vehicle in its empty condition;

a gas having an initial charge pressure of $P_1$ in the part of said housing adjacent said closed end, $P_2$ being less than $P_1$;

oil placed in said housing in the space not occupied by said gas and also in said conduit to said accumulator.

* * * * *